(12) United States Patent
Alferink et al.

(10) Patent No.: US 12,583,376 B1
(45) Date of Patent: Mar. 24, 2026

(54) TRAILER ASSEMBLY

(71) Applicants: Mark Alferink, Holland, MI (US);
Michael DeJonge, Holland, MI (US)

(72) Inventors: Mark Alferink, Holland, MI (US);
Michael DeJonge, Holland, MI (US)

(73) Assignee: Generation Trailers, Inc., Holland, MI
(US)

( * ) Notice: Subject to any disclaimer, the term of this
patent is extended or adjusted under 35
U.S.C. 154(b) by 410 days.

(21) Appl. No.: 18/224,225

(22) Filed: Jul. 20, 2023

(51) Int. Cl.
| | |
|---|---|
| *B60P 3/10* | (2006.01) |
| *B60G 11/02* | (2006.01) |
| *B60R 16/033* | (2006.01) |
| *B62D 63/06* | (2006.01) |
| *F15B 15/14* | (2006.01) |
| *F15B 21/08* | (2006.01) |
| *B60Q 1/44* | (2006.01) |

(52) U.S. Cl.
CPC ............ *B60P 3/1066* (2013.01); *B60G 11/02*
(2013.01); *B60R 16/033* (2013.01); *B62D*
*63/061* (2013.01); *B62D 63/068* (2013.01);
*F15B 15/1428* (2013.01); *F15B 21/08*
(2013.01); *B60G 2202/11* (2013.01); *B60G*
*2300/04* (2013.01); *B60Q 1/44* (2013.01)

(58) Field of Classification Search
CPC . B60P 1/44; B60P 3/1066; B60P 11/02; B60P
16/033; B60P 2202/01; B60P 2300/04;
B62D 63/061; B62D 63/068; F15B
15/1428; F15B 21/08
USPC ...................................................... 280/414.1
See application file for complete search history.

(56) References Cited

U.S. PATENT DOCUMENTS

| | | | | |
|---|---|---|---|---|
| 3,083,980 | A | * | 4/1963 | Page ........................ B60G 5/02 |
| | | | | 267/30 |
| 3,768,677 | A | | 10/1973 | Moss |
| 3,974,924 | A | | 8/1976 | Ullman, Jr. |
| D267,559 | S | | 1/1983 | Wormser |
| 4,395,185 | A | | 7/1983 | Whaley |
| 4,623,161 | A | | 11/1986 | Sprague |
| 4,801,153 | A | | 1/1989 | Wilson |
| D308,496 | S | | 6/1990 | Anderson |
| 5,004,260 | A | | 4/1991 | Smyly, Sr. |
| 5,133,571 | A | | 7/1992 | Urbank |
| 5,292,145 | A | | 3/1994 | Ostrand |
| D368,053 | S | | 3/1996 | Gallagher |
| D390,814 | S | | 2/1998 | Weinacht |
| 6,003,888 | A | | 12/1999 | Godbersen |
| 6,719,317 | B1 | | 4/2004 | Grovender et al. |
| D542,716 | S | | 5/2007 | Warren |
| 8,403,353 | B2 | | 3/2013 | Fink |

(Continued)

*Primary Examiner* — Alentin Neacsu
*Assistant Examiner* — Felicia L. Brittman-Alabi
(74) *Attorney, Agent, or Firm* — King & Partners, PLC

(57) ABSTRACT

A trailer assembly, including: (a) a frame sub-assembly,
wherein the frame sub-assembly comprises a pair of rails
adapted to support a pontoon/tritoon watercraft thereon; (b)
at least two ground-engaging wheels, wherein the at least
two ground-engaging wheels are associated with the frame
sub-assembly; (c) a trailer coupler, wherein the trailer cou-
pler is releasably securable to a trailer ball; (d) a rail drive
sub-assembly, wherein the rail drive sub-assembly com-
prises a battery, an electrically powered hydraulic pump, at
least two actuating hydraulic cylinders, and an up/down
controller; and (e) wherein the trailer assembly is readily
convertible between a raised position and a lowered posi-
tion.

16 Claims, 10 Drawing Sheets

(56)         References Cited

U.S. PATENT DOCUMENTS

| 9,056,574 B2 | 6/2015 | Kirchhan |
| D737,178 S | 8/2015 | Crane |
| 10,583,768 B2 | 3/2020 | Thorley |
| 2005/0067799 A1 * | 3/2005 | Smith .................... B60P 1/027 |
| | | 280/6.151 |
| 2023/0406189 A1 * | 12/2023 | Hudak .................. B62D 63/08 |

* cited by examiner

10

10

10

48                  48

TRAILER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to trailers for watercraft, and, more particularly, to trailers for pontoons/tritoons that are readily convertible between a raised position and a lowered position. The pontoon/tritoon trailers of the present invention comprise a novel, dual frame rail configuration that is extremely strong and stable, and enables the watercraft load to be transferred to the running gear and tires of the lower trailer frame. Such a configuration enhances safety during watercraft storage, deployment, retrieval, and transportation. The watercraft trailers of the present invention also include taillights that are fully integrated into the structure of the trailer. Such integration protects the taillights from damage and enhances safety with increased taillight visibility. The pontoon/tritoon trailers of the present invention are further optionally hot dipped galvanized for industry leading durability and rust prevention.

2. Background Art

Watercraft trailers have been known in the art for years and are the subject of a plurality of patents and publications, including: U.S. Pat. No. 8,403,353 entitled "Boat Trailer with Rotatable Support Frame," U.S. Pat. No. 6,719,317 entitled "Pontoon Boat Trailer," U.S. Pat. No. 6,003,888 entitled "Pontoon Boat Center Lift Trailer Axle Assembly," U.S. Pat. No. 5,292,145 entitled "Boat Trailer," U.S. Pat. No. 5,133,571 entitled "Hydraulic-Roller Boat Trailer," U.S. Pat. No. 5,004,260 entitled "Trailered Boat Cradle," U.S. Pat. No. 4,801,153 entitled "Pontoon Trailer," U.S. Pat. No. 4,395,185 entitled "Self-Leveling Boat Trailer," U.S. Pat. No. 3,974,924 entitled "Boat Trailer," and U.S. Pat. No. 3,768,677 entitled "Boat Trailer"—all of which are hereby incorporated herein by reference in their entirety including all references cited therein.

U.S. Pat. No. 8,403,353 appears to disclose boat trailers with rotatable support structures. The boat trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support a boat thereon. Also provided is a support frame lifting assembly connected to the support frame assembly and the wheel assembly. The support frame lifting assembly is operable to raise at least a portion of the support frame assembly above the wheel assembly, so as to permit rotation of the carousel frame portion relative to the base frame portion. Advantageously, this boat trailer may be used to reorient a boat carried on the support frame assembly for bow-first launching into water.

U.S. Pat. No. 6,719,317 appears to disclose a self-loading and unloading trailer which can be operated by a single person to load a boat from difficult boat ramps or even directly from the ground provides rollers for engaging a boat. A first set of rollers engages the boat at ground level, enabling the boat to be winched directly from the ground or from a shallow landing. As the boat is loaded, the rollers shift and transfer the load directly to a second set of rollers. Finally, the boat weight shifts the trailer again, causing the rollers to retract, thereby bringing the boat to safely rest on bunks for storage or during transit. In the preferred embodiment, the boat is a pontoon boat, though other appropriate boat hulls are contemplated for use with this invention.

U.S. Pat. No. 6,003,888 appears to disclose a torsion axle for a trailer for transporting a load such as a pontoon boat. The torsion axle assembly is part of a wheel unit for maintaining stability for the trailer during transport. The torsion axle is assembled to have two pairs of resilient elements and an elongated shaft housed between inner and outer elongated sections. The inner and outer elongated sections are held together temporarily by a weld and then releasably held together by releasable fasteners in a normal use position.

U.S. Pat. No. 5,292,145 appears to disclose a boat trailer that includes a rectangular rear frame section and a forwardly extending hitch bar. On the rear frame section is mounted a pair of longitudinally extending bunks onto which the boat can rest during transportation to avoid pressure points. Inside the bunks toward a longitudinal center line of the trailer are provided two pairs of roller assemblies which can be raised to a position to hold the boat above the bunks for loading and unloading and can be lowered to a position in which the boat is lowered onto the bunks and separated from the rollers to avoid pressure points during transportation. The roller assemblies are commonly actuated by a linear actuator arrangement at the front of the hitch bar. Each roller assembly includes four rollers independently pivotal to allow the rollers to follow the contour of the boat. At a forward end of the hitch bar is mounted a security leg which can extend along the underside of the hitch bar or can be moved downwardly to a deployed position in which it raises the hitch bar above the normal hitch position so as to incline the trailer rearwardly and can be locked in that position to prevent the hitch being used.

U.S. Pat. No. 5,133,571 appears to disclose a boat trailer which combines the advantages of previously available hydraulic and roller-type trailer constructions. In one embodiment of this invention, the trailer bed is of a U-frame construction, with a plurality of side rollers and an adjustable roller member for supporting the keel of a boat to be carried about a marina, boat yard, or boat showroom or area. The trailer, at the same time, is arranged to couple to any appropriate towing vehicle by a pivotable tongue, on which a hydraulic cylinder or some other means is secured to tilt the trailer bed and to assist in the loading and unloading of the boat for transport.

U.S. Pat. No. 5,004,260 appears to disclose a boat cradle that is pushed from, and pulled onto, the bed of a combined trailer by launcher and retriever cabling in combination with a reversible drum winch and a telescoping push/pull rod. Longitudinal alignment of the cradle with the bed of the trailer is maintained by a folding stabilizer assembly. If desired, a telescoping stabilizer is substituted for the folding stabilizer component of the stabilizer assembly. The cradle has a buoyant multi-wheeled boat keel support platform and hand rails. A cradled vessel is weather protected by placing conventional light weight covered framing over the cradle. Alternatively, the vessel is protected by having an enclosure installed over the combined trailer.

U.S. Pat. No. 4,801,153 appears to disclose a trailer for a pontoon boat or other multiple-hull watercraft that has a pair of V-shaped glide members positioned for supporting the pontoons along substantially their entire length. The glide members are covered with a fabric, such as carpet, and are provided with a plurality of rollers in the bight of the V to provide superior support and to assist in loading and unloading a craft. The glides and frame beneath are articulated so that a rear trailer portion may be pivoted to assist in loading and unloading a craft. The trailer wheels are located laterally beyond the glides to provide exceptional load stability.

U.S. Pat. No. 4,395,185 appears to disclose a self-leveling boat trailer that is adapted to be towed behind a vehicle. In one embodiment, the trailer includes a pivotally mounted tongue assembly and a wheeled undercarriage. A flotation system at the stern end of the trailer causes the stern of the trailer to float upon entry into the water. A control linkage is utilized to pivot the tongue assembly in response to the flotation of the trailer stern, lowering the bow end of the trailer, thereby maintaining the trailer in a level position. In a second embodiment, the entire support platform pivots while the tongue assembly and wheeled undercarriage are coupled to a single rigid member. In either embodiment, boat launch and recovery are improved by maintaining the trailer in a level position despite the incline of a typical launching ramp.

U.S. Pat. No. 3,974,924 appears to disclose a boat trailer having weight distributing and stabilizing cradles fore and aft for small craft, and cradles fore, aft, and midships for medium to heavy craft. The aft cradle provides mechanical leverage to assist during winching to lift and to lower a boat hull from and into the water.

U.S. Pat. No. 3,768,677 appears to disclose a boat trailer which is adapted to be towed by an automobile or other vehicle and having one or more pairs of wheels, each wheel being mounted eccentrically on an independently rotatable axle. Lever and linking means are provided for rotating each axle separately to raise and lower the body of the trailer, facilitating boat loading and launching. For normal support of a boat during travel, adjustable padded bolsters of large contact area are provided. An auxiliary boat support means is provided to lift the boat off the bolsters on rotation of the axle as the trailer is lowered. The lifting mechanism is locked in raised position for travel. The lift mechanism includes a resilient connection for each wheel, providing independent suspension. The elevating mechanism is operated by a winch which also can be used to pull the boat onto the trailer.

While the above-identified patents and publications do appear to disclose various trailers for watercraft, their configurations remain non-desirous and/or problematic inasmuch as, among other things, none of the above-identified trailers appear to be readily convertible between a raised position and a lowered position and comprise the novel, dual frame rail configuration as disclosed herein.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a trailer assembly comprising, consisting essentially of, and/or consisting of: (a) a frame sub-assembly, wherein the frame sub-assembly comprises a pair of rails adapted to support a pontoon/tritoon watercraft thereon; (b) at least two ground-engaging wheels, wherein the at least two ground-engaging wheels are associated with the frame sub-assembly; (c) a trailer coupler, wherein the trailer coupler is releasably securable to a trailer ball; (d) a rail drive sub-assembly, wherein the rail drive sub-assembly comprises a battery, an electrically powered hydraulic pump, at least two actuating hydraulic cylinders, and an up/down controller; and (e) wherein the trailer assembly is readily convertible between a raised position and a lowered position.

In a preferred embodiment of the present invention, the frame sub-assembly comprises a dual frame rail configuration that is extremely strong and stable, and enables the watercraft load to be transferred to the running gear and tires of the lower trailer frame which enhances safety during watercraft storage, deployment, retrieval, and transportation.

In another preferred embodiment of the present invention, the frame sub-assembly comprises a lower left horizontal support member, a lower right horizontal support member, an upper left horizontal support member having a rail secured thereto, an upper right horizontal support member having a rail secured thereto, one or more rotatable vertical support members positioned between the upper and lower left horizontal support members, one or more rotatable vertical support members positioned between the upper and lower right horizontal support members, and one or more horizontal cross support members positioned between the lower left and right horizontal support members.

In yet another preferred embodiment of the present invention, the frame sub-assembly further comprises an upper front horizontal cross support member, a lower front horizontal cross support member, a front vertical support member, left and right vertical stop members, a front horizontal support member, wherein the trailer coupler is secured thereto, and slanted support member positioned between the front vertical support member and the front horizontal support member.

In one preferred embodiment of the present invention, the frame sub-assembly further comprises left and right rear vertical supports having brake lights integrated therein.

In a preferred implementation of the present invention, the rotatable vertical support members each include a bumper bracket secured thereto.

In another preferred implementation of the present invention, the bumper bracket includes a bumper secured thereto.

In yet another preferred implementation of the present invention, bumpers are associated with a rear end of the upper left and right horizontal support members.

In another aspect of the present invention, the at least two ground-engaging wheels comprise three pair of ground-engaging wheels that are associated with leaf spring suspensions having equalizers.

In a preferred embodiment of the present invention, the battery is secured to the frame sub-assembly proximate the front end thereof.

In another preferred embodiment of the present invention, the electrically powered hydraulic pump is secured to the frame sub-assembly proximate the front end thereof.

In yet another preferred embodiment of the present invention, the at least two actuating hydraulic cylinders comprise a first actuating hydraulic cylinder secured to the lower left horizontal support member and one of the vertical support members and a second actuating hydraulic cylinder secured to the lower right horizontal support member and one of the vertical support members.

In one preferred embodiment of the present invention, the at least two actuating hydraulic cylinders comprise two, four, six, and/or eight actuating hydraulic cylinders.

In a preferred implementation of the present invention, the up/down controller is in electrical communication with the electrically powered hydraulic pump.

In another preferred implementation of the present invention, at least a portion of the frame sub-assembly is hot dipped galvanized.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
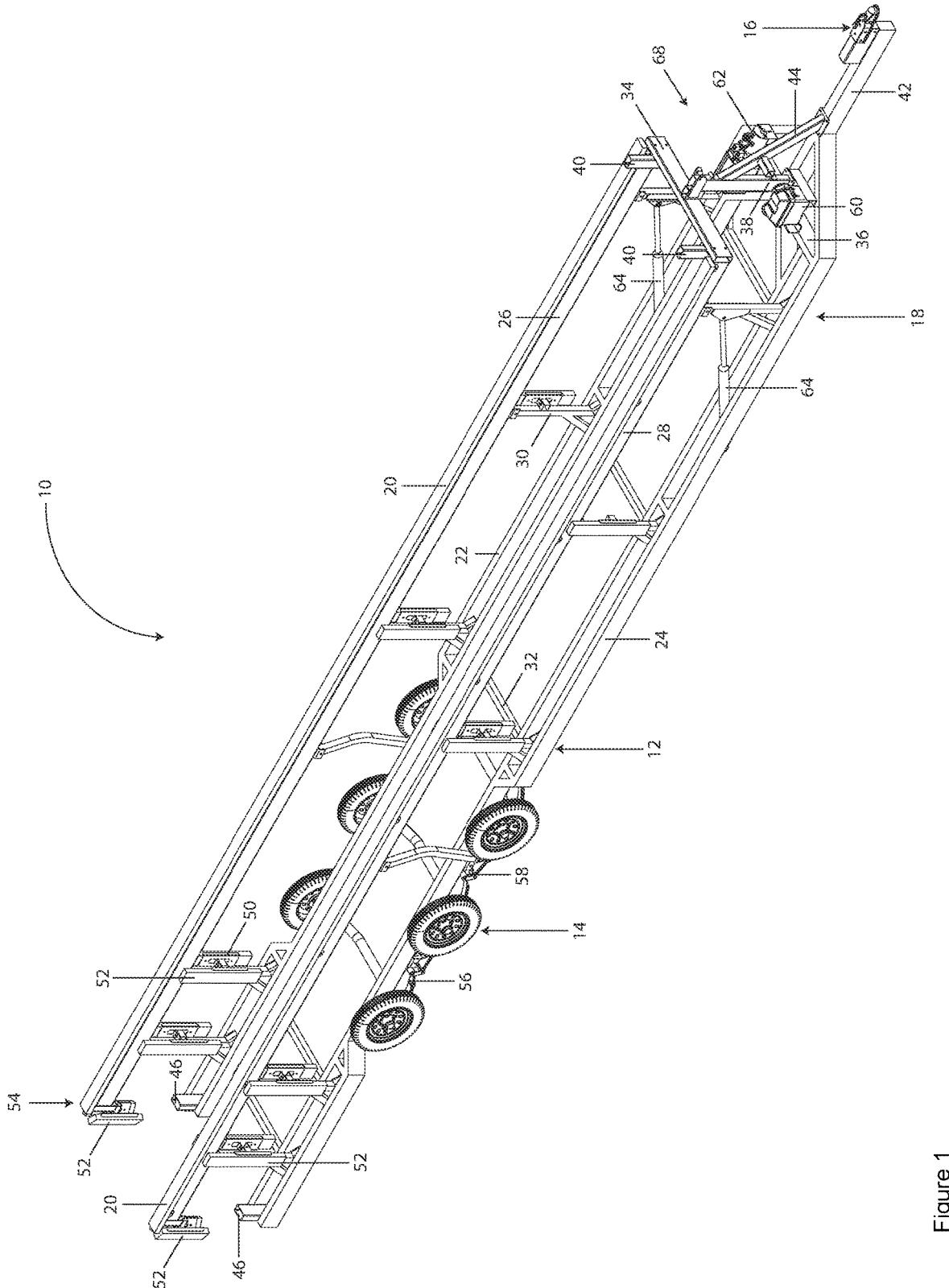
Figure 2:
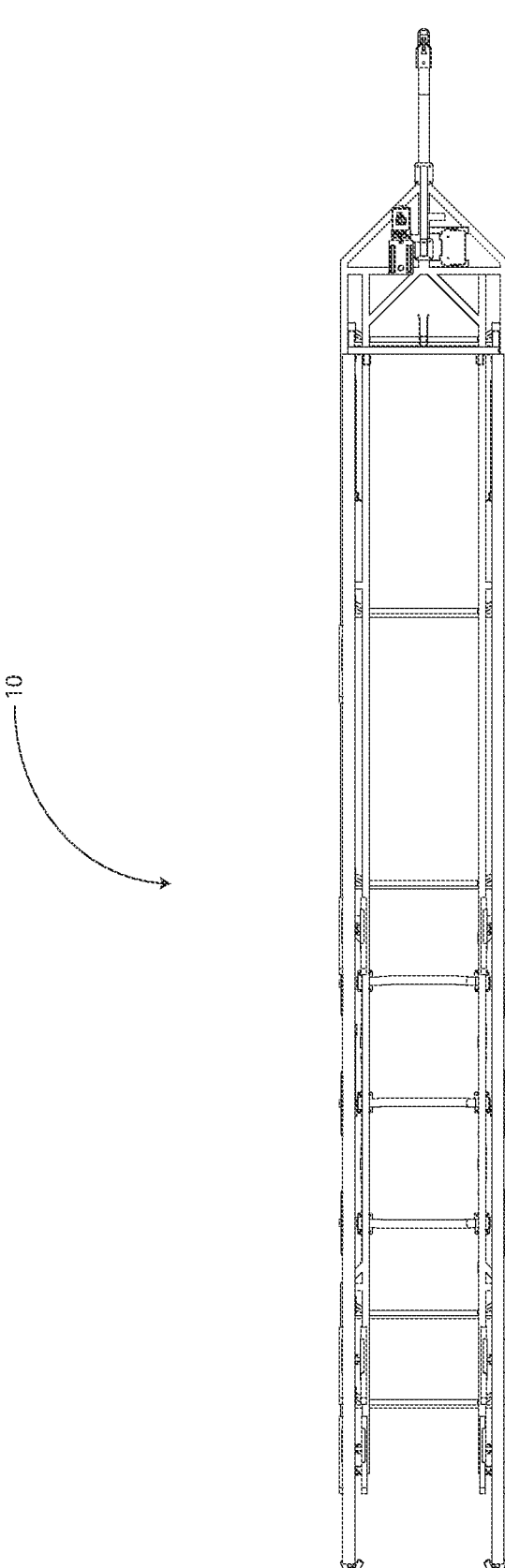
Figure 3:
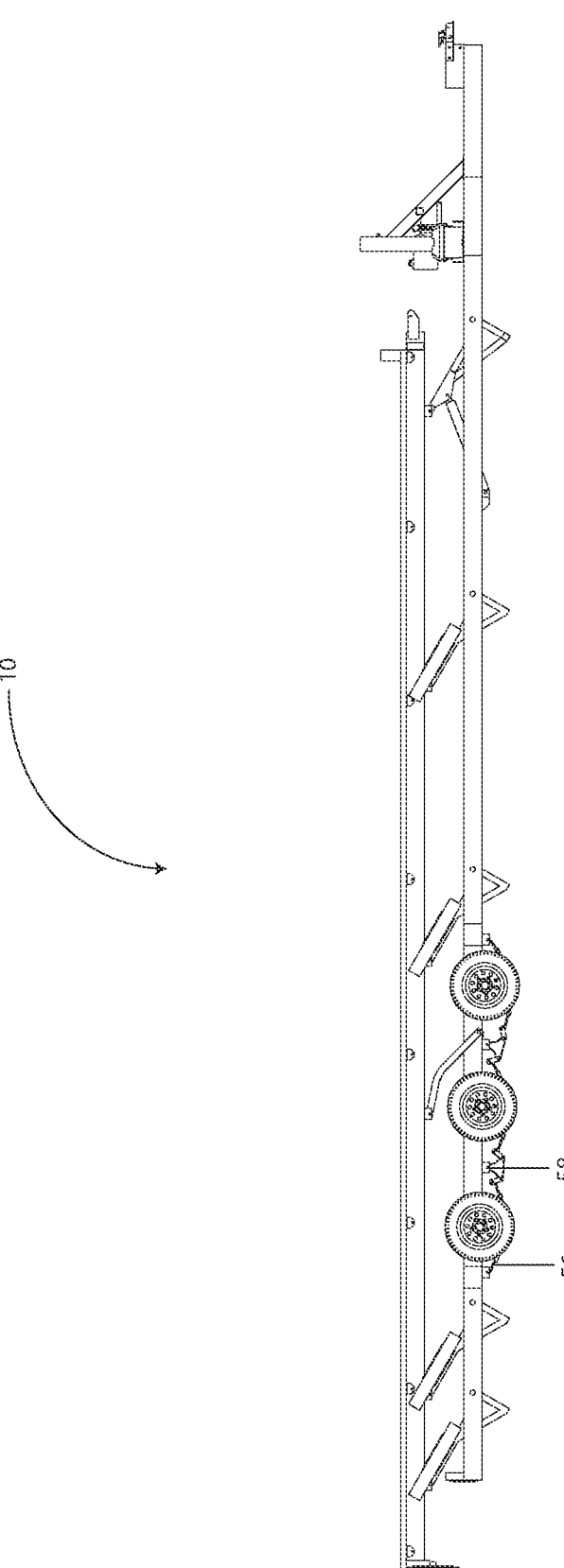
Figure 4:
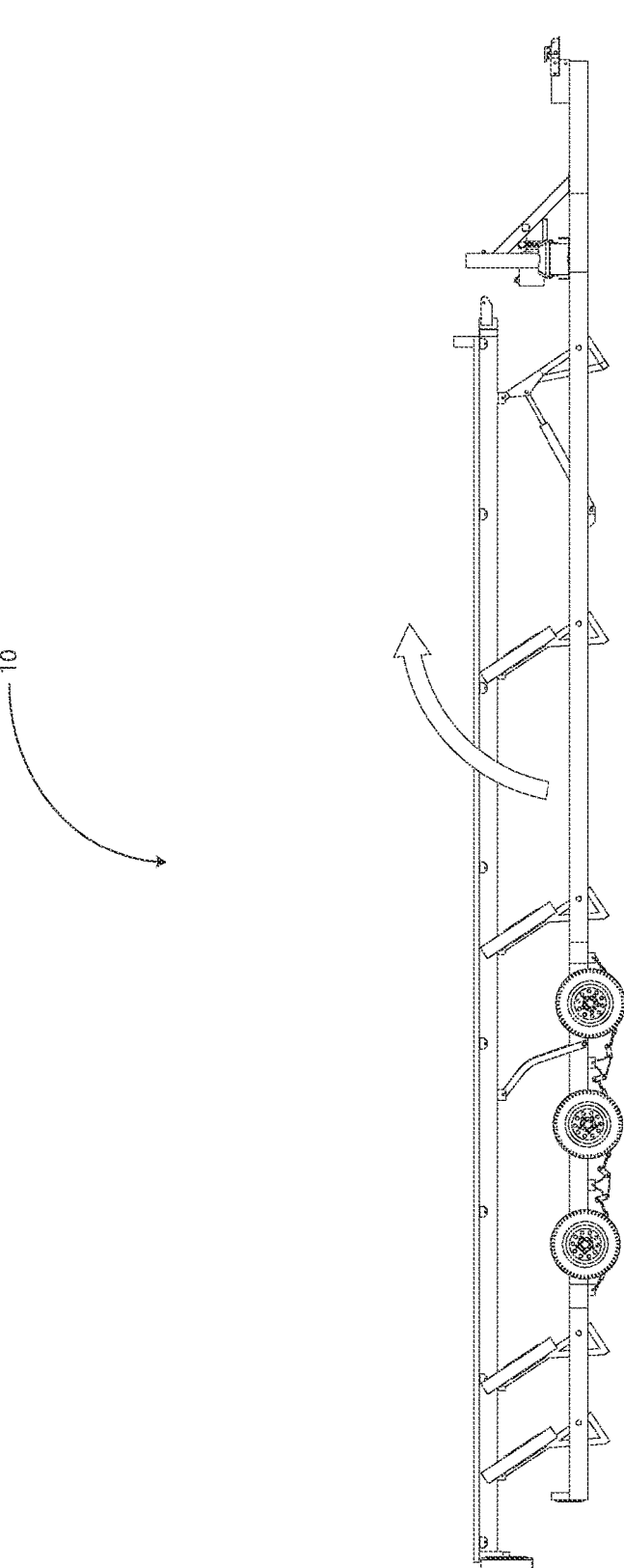
Figure 5:
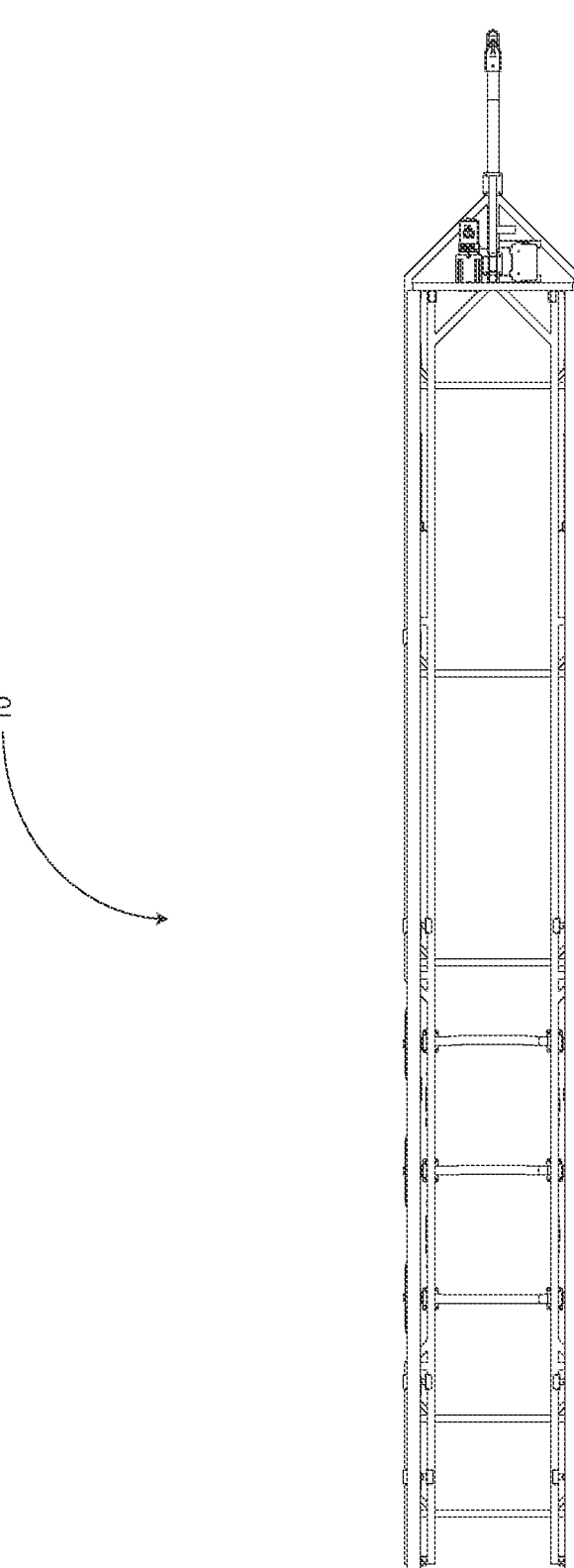
Figure 6:
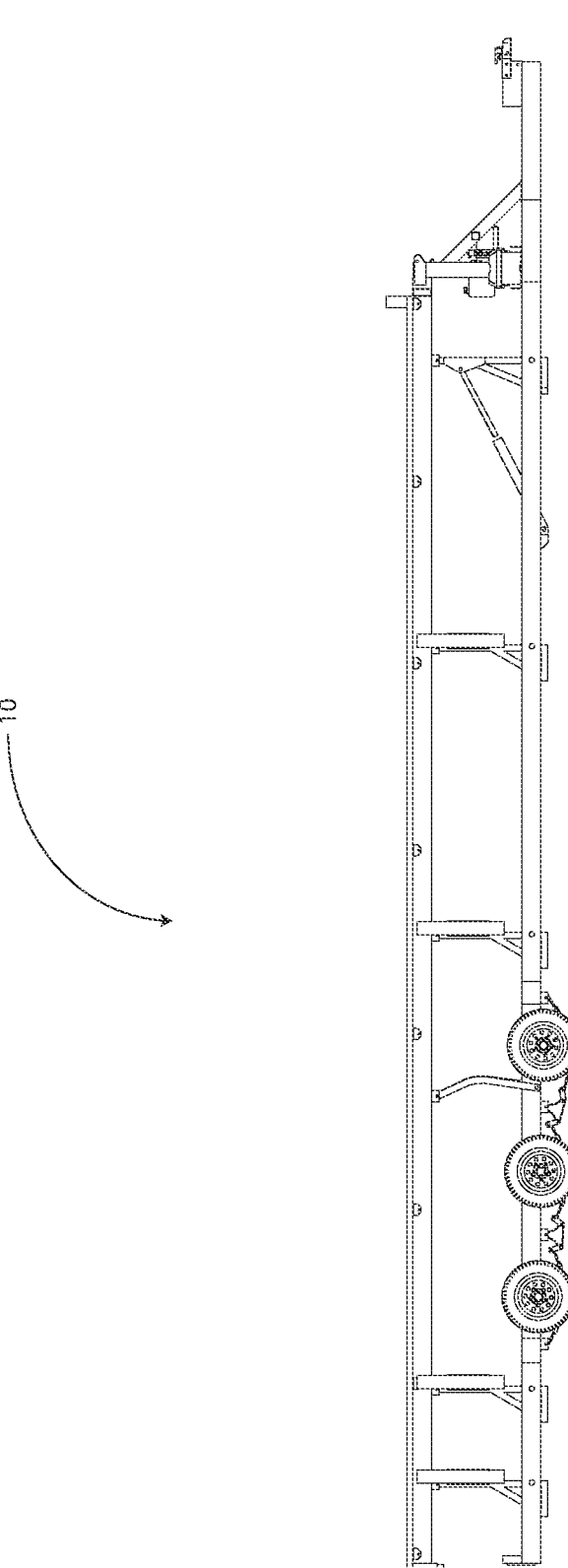
Figure 7:
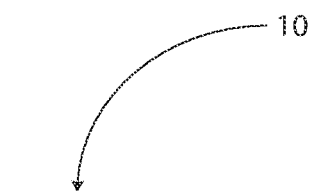
Figure 7:
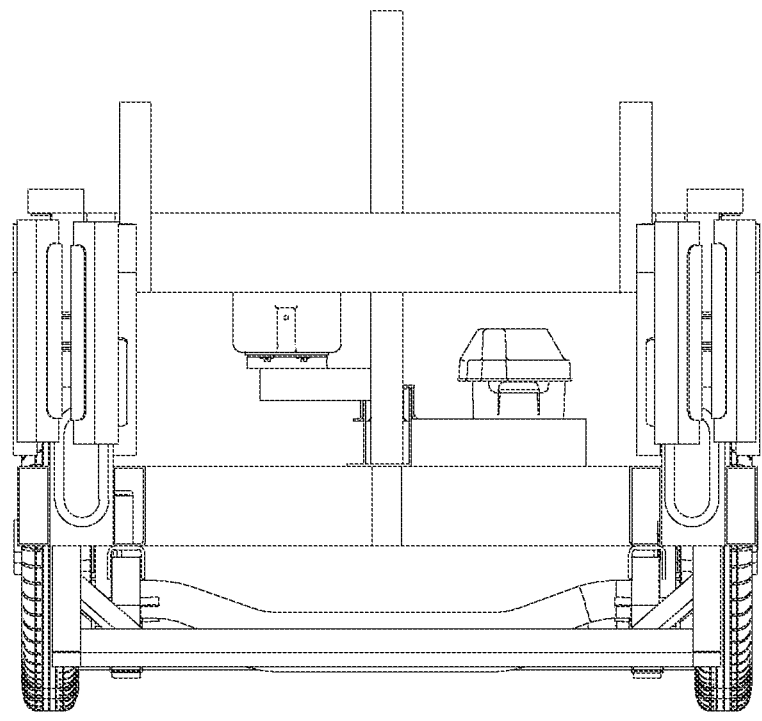
Figure 8:
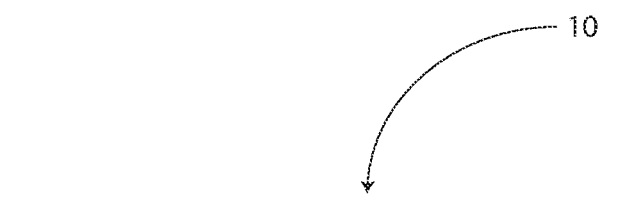
Figure 8:
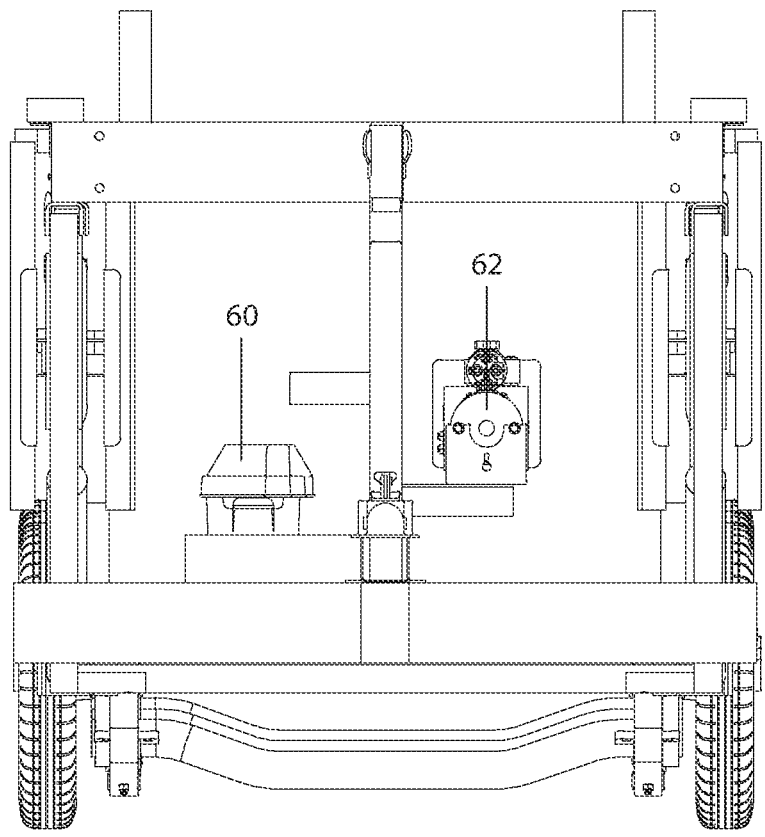
Figure 9:
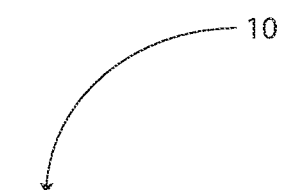
Figure 9:
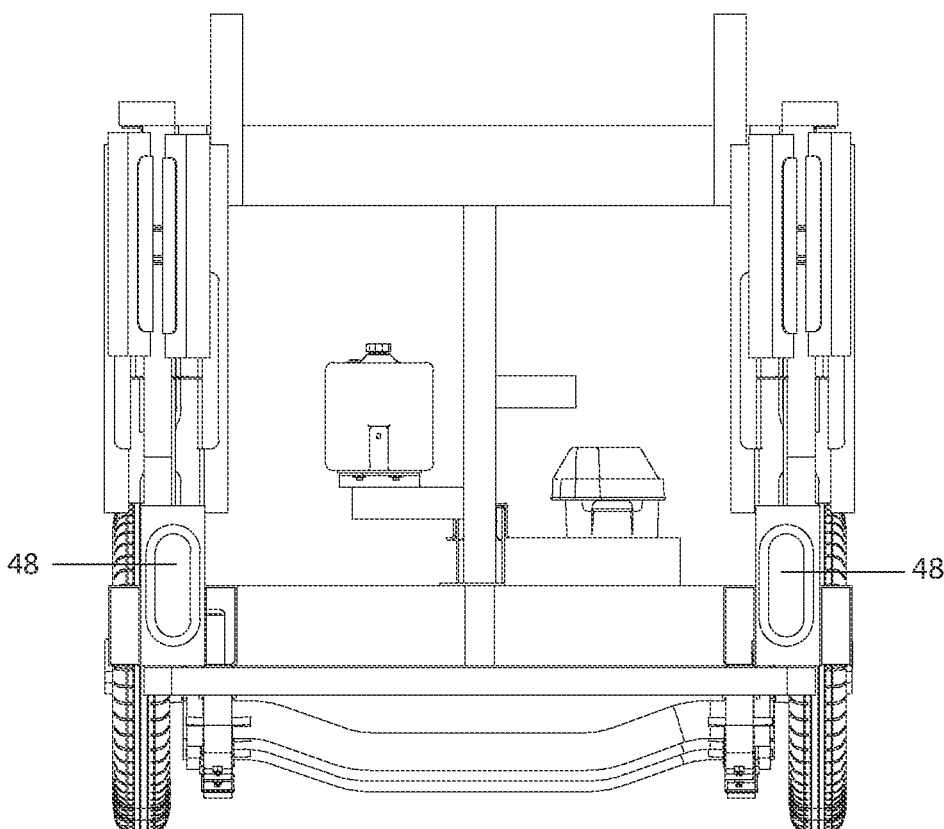
Figure 10:
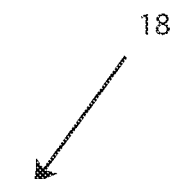
Figure 10:
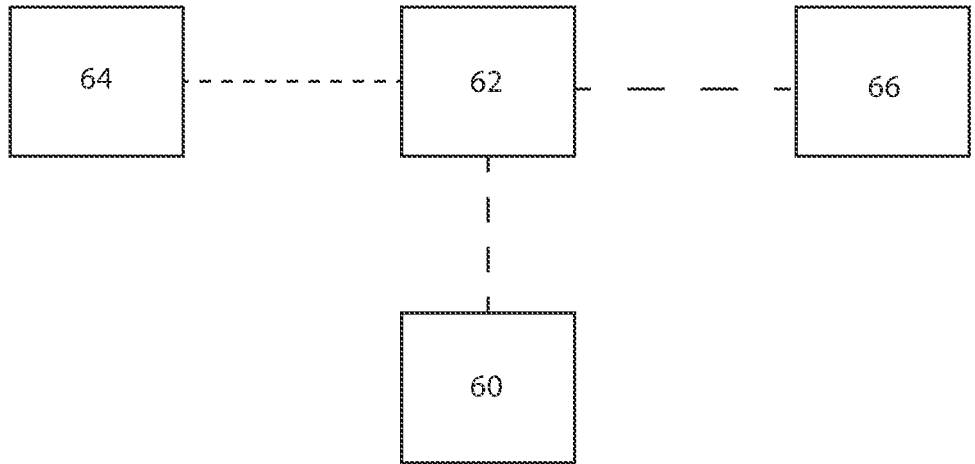

The invention will now be described with reference to the drawings wherein:

FIG. 1 of the drawings is a perspective view of an embodiment of a trailer assembly of the present invention;

FIG. 2 of the drawings is a top view of the trailer assembly of FIG. 1 shown in a lowered position (e.g., launch, retrieval, storage, etcetera);

FIG. 3 of the drawings is a side view of the trailer assembly of FIG. 1 shown in a lowered position;

FIG. 4 of the drawings is a side view of the trailer assembly of FIG. 1 shown in an intermediate or partially raised position;

FIG. 5 of the drawings is a top view of the trailer assembly of FIG. 1 shown in a raised (e.g., transportation, storage, etcetera);

FIG. 6 of the drawings is a side view of the trailer assembly of FIG. 1 shown in a raised position;

FIG. 7 of the drawings is a rear view of the trailer assembly of FIG. 1 shown in a lowered position;

FIG. 8 of the drawings is a front view of the trailer assembly of FIG. 1 shown in a raised position;

FIG. 9 of the drawings is a rear view of the trailer assembly of FIG. 1 shown in a raised position; and FIG. 10 of the drawings is a schematic diagram of the rail drive sub-assembly of the present invention.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters.

In accordance with the present invention, the trailer assembly includes, among other things, a novel dual frame rail configuration that is extremely strong and stable, and enables the watercraft (e.g., pontoon, tritoon, etcetera) load to be transferred to the running gear and tires of the lower trailer frame which enhances safety during watercraft storage, deployment, retrieval, and transportation.

Referring now to the drawings, and to FIGS. 1-10 in particular, a first embodiment of trailer assembly 10, is shown as generally comprising frame sub-assembly 12, two or more ground-engaging wheels 14, trailer coupler 16, and rail drive sub-assembly 18.

Frame sub-assembly 12 includes a pair of rails 20 that are adapted to support a pontoon/tritoon watercraft thereon. Preferably, frame sub-assembly 12 includes lower left horizontal support member 22, lower right horizontal support member 24, upper left horizontal support member 26 having rail 20 secured thereto, upper right horizontal support member 28 having rail 20 secured thereto, one or more rotatable vertical support members 30 positioned between the upper and lower left horizontal support members, one or more rotatable vertical support members 30 positioned between the upper and lower right horizontal support members, and one or more horizontal cross support members 32 positioned between the lower left and right horizontal support members.

In accordance with the present invention, frame sub-assembly 12 preferably includes upper front horizontal cross support member 34, lower front horizontal cross support member 36, front vertical support member 38, left and right vertical stop members 40, front horizontal support member 42, wherein trailer coupler 16 is secured thereto, and slanted support member 44 positioned between the front vertical support member and the front horizontal support member.

In one embodiment, frame sub-assembly 12 includes left and right rear vertical supports 46 having brake lights 48 integrated therein.

Preferably, the rotatable vertical support members each include bumper bracket 50 and bumper 52 secured thereto. Bumpers 52 are also preferably associated with rear end 54 of the upper left and right horizontal support members.

It will be understood that the terms horizontal and vertical, as used herein, generally and/or approximately horizontal and/or vertical (i.e., +/−10 degrees). With regard to the term horizontal, the term is intended to be with respect to a length, longitudinal axis, and/or the ground. With regard to the term vertical, the term is intended to be with respect to height, upright axis, and/or orthogonal to the ground when the trailer assembly is in the raised position (See FIG. 1).

Frame sub-assembly 12 is preferably fabricated from a material selected from the group consisting of a metal (e.g., aluminum, iron, transition metals, etcetera), a metal alloy (e.g., steel, etcetera), a natural resin, a synthetic resin, a plastic, a composite, carbon and/or wood. Frame sub-assembly 12 is also preferably heat treated, chemically treated, and/or hot dipped galvanized.

Frame sub-assembly 12 preferably includes two or more (e.g., 2, 4, 6, 8, 10, etcetera) ground-engaging wheels 14. For enhanced stability, wheels 14 are associated with leaf spring suspensions 56 having equalizers 58.

Frame sub-assembly 12 also includes trailer coupler 16 which is releasably securable to a trailer ball mounted to a towing vehicle (e.g., car, truck, sport utility vehicle (SUV), etcetera).

Trailer assembly 10 includes rail drive sub-assembly 18 preferably having battery 60 (e.g., 12 V high capacity), electrically powered hydraulic pump 62, a pair of actuating hydraulic cylinders 64, and up/down controller 66 (See FIG. 10). Battery 60 and up/down controller 66 are in electrical communication with electrically powered hydraulic pump 62. Electrically powered hydraulic pump 62 is in fluid communication, via hydraulic lines, with actuating hydraulic cylinders 64.

Battery 60 is preferably secured to frame sub-assembly 12 proximate front end 68 thereof, and electrically powered hydraulic pump 62 is also secured to frame sub-assembly 12 proximate front end 68 thereof.

Preferably, the actuating hydraulic cylinders comprise first actuating hydraulic cylinder 64 secured to the lower left horizontal support member and one of the vertical support members and second actuating hydraulic cylinder 64 secured to the lower right horizontal support member and one of the vertical support members.

As is best shown in FIGS. 3, 4, and 6, trailer assembly 10 is readily convertible between raised and lowered positions.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A trailer assembly, comprising:
   a frame sub-assembly having a front end, wherein the frame sub-assembly comprises a dual frame rail configuration including an upper rail frame and a lower frame, said upper rail frame including a pair of rails adapted to support a pontoon/tritoon watercraft thereon;
   at least two ground-engaging wheels, wherein the at least two ground-engaging wheels are associated with said lower frame of the frame sub-assembly;
   a trailer coupler, wherein the trailer coupler is releasably securable to a trailer ball;
   a rail drive sub-assembly, wherein the rail drive sub-assembly comprises a battery, an electrically powered hydraulic pump, at least two actuating hydraulic cylinders, and an up/down controller; and
   wherein the trailer assembly is readily convertible between a raised position and a lowered position by pivoting said upper rail frame relative to said lower frame.

2. The trailer assembly according to claim 1, wherein the dual frame rail configuration is extremely strong and stable, and enables a watercraft load to be transferred to running gear and tires of the lower frame which enhances safety during watercraft storage, deployment, retrieval, and transportation.

3. The trailer assembly according to claim 1, wherein the frame sub-assembly comprises a lower left horizontal support member, a lower right horizontal support member, an upper left horizontal support member having a rail secured thereto, an upper right horizontal support member having a rail secured thereto, one or more rotatable vertical support members positioned between the upper and lower left horizontal support members, one or more rotatable vertical support members positioned between the upper and lower right horizontal support members, and one or more horizontal cross support members positioned between the lower left and right horizontal support members.

4. The trailer assembly according to claim 3, wherein the frame sub-assembly further comprises an upper front horizontal cross support member, a lower front horizontal cross support member, a front vertical support member, left and right vertical stop members, a front horizontal support member, wherein the trailer coupler is secured thereto, and slanted support member positioned between the front vertical support member and the front horizontal support member.

5. The trailer assembly according to claim 4, wherein the frame sub-assembly further comprises left and right rear vertical supports having brake lights integrated therein.

6. The trailer assembly according to claim 3, wherein the rotatable vertical support members each include a bumper bracket secured thereto.

7. The trailer assembly according to claim 6, wherein the bumper bracket includes a bumper secured thereto.

8. The trailer assembly according to claim 3, wherein bumpers are associated with a rear end of the upper left and right horizontal support members.

9. The trailer assembly according to claim 3, wherein the at least two ground-engaging wheels comprise three pair of ground-engaging wheels that are associated with leaf spring suspensions having equalizers.

10. The trailer assembly according to claim 1, wherein the battery is secured to the frame sub-assembly proximate the front end thereof.

11. The trailer assembly according to claim 1, wherein the electrically powered hydraulic pump is secured to the frame sub-assembly proximate the front end thereof.

12. The trailer assembly according to claim 1, wherein the at least two actuating hydraulic cylinders comprise a first actuating hydraulic cylinder secured to a lower left horizontal support member and a first vertical support member and a second actuating hydraulic cylinder secured to a lower right horizontal support member and a second vertical support member.

13. The trailer assembly according to claim 1, wherein the up/down controller is in electrical communication with the electrically powered hydraulic pump.

14. The trailer assembly according to claim 1, wherein at least a portion of the frame sub-assembly is hot dipped galvanized.

15. A pontoon/tritoon watercraft trailer assembly, comprising:

a lower frame sub-assembly including a lower left horizontal support member, a lower right horizontal support member, at least two ground-engaging wheels secured to said lower frame sub-assembly via leaf spring suspensions having equalizers, and one or more horizontal cross support members extending between said lower left and lower right horizontal support members;

an upper rail frame sub-assembly pivotally connected to said lower frame sub-assembly via one or more rotatable vertical support members, said upper rail frame sub-assembly including an upper left horizontal support member having a pontoon support rail secured thereto and an upper right horizontal support member having a pontoon support rail secured thereto;

a hydraulic rail drive sub-assembly including a battery, an electrically powered hydraulic pump, a first actuating hydraulic cylinder operably connected between said lower left horizontal support member and one of said rotatable vertical support members, a second actuating hydraulic cylinder operably connected between said lower right horizontal support member and one of said rotatable vertical support members, and an up/down controller in electrical communication with said hydraulic pump;

a front tongue assembly including a front horizontal support member, a trailer coupler secured thereto, and a slanted support member; and wherein actuation of said hydraulic cylinders pivots said upper rail frame sub-assembly relative to said lower frame sub-assembly to convert the trailer between a raised transport position and a lowered watercraft loading position, and wherein, in said raised position, pontoon watercraft load is transferred through said upper rail frame sub-assembly and said rotatable vertical support members directly to said lower frame sub-assembly and said ground-engaging wheels.

16. A pontoon/tritoon watercraft trailer assembly, consisting of:

a lower frame sub-assembly consisting of a lower left horizontal support member, a lower right horizontal support member, three pairs of ground-engaging wheels secured via leaf spring suspensions with equalizers, and a plurality of horizontal cross support members;

an upper rail frame sub-assembly consisting of an upper left horizontal support member with a pontoon support rail fixed thereto, an upper right horizontal support member with a pontoon support rail fixed thereto, and two pairs of rotatable vertical support members pivotally connecting said upper rail frame sub-assembly to said lower frame sub-assembly;

a hydraulic rail drive sub-assembly consisting of a twelve-volt battery mounted proximate a front end of said lower frame sub-assembly, an electrically powered hydraulic pump mounted proximate said front end, a first hydraulic cylinder connected between said lower left horizontal support member and one rotatable vertical support member, a second hydraulic cylinder connected between said lower right horizontal support member and one rotatable vertical support member, and an up/down controller;

a front tongue assembly consisting of an upper front horizontal cross support member, a lower front horizontal cross support member, a front vertical support member, left and right vertical stop members, a front horizontal support member with a trailer coupler secured thereto, and a slanted support member;

left and right rear vertical supports with integrated brake lights;

bumper brackets with bumpers secured to said rotatable vertical support members and to rear ends of said upper left and upper right horizontal support members; and wherein said hydraulic cylinders pivot said upper rail frame sub-assembly to convert the trailer between a raised position and a lowered position, and wherein watercraft load is transferred directly to said lower frame sub-assembly and said ground-engaging wheels in said raised position.

* * * * *